Z. WILLIAMS.
Butter Worker.
No. 21,460. Patented Sept. 7, 1858.
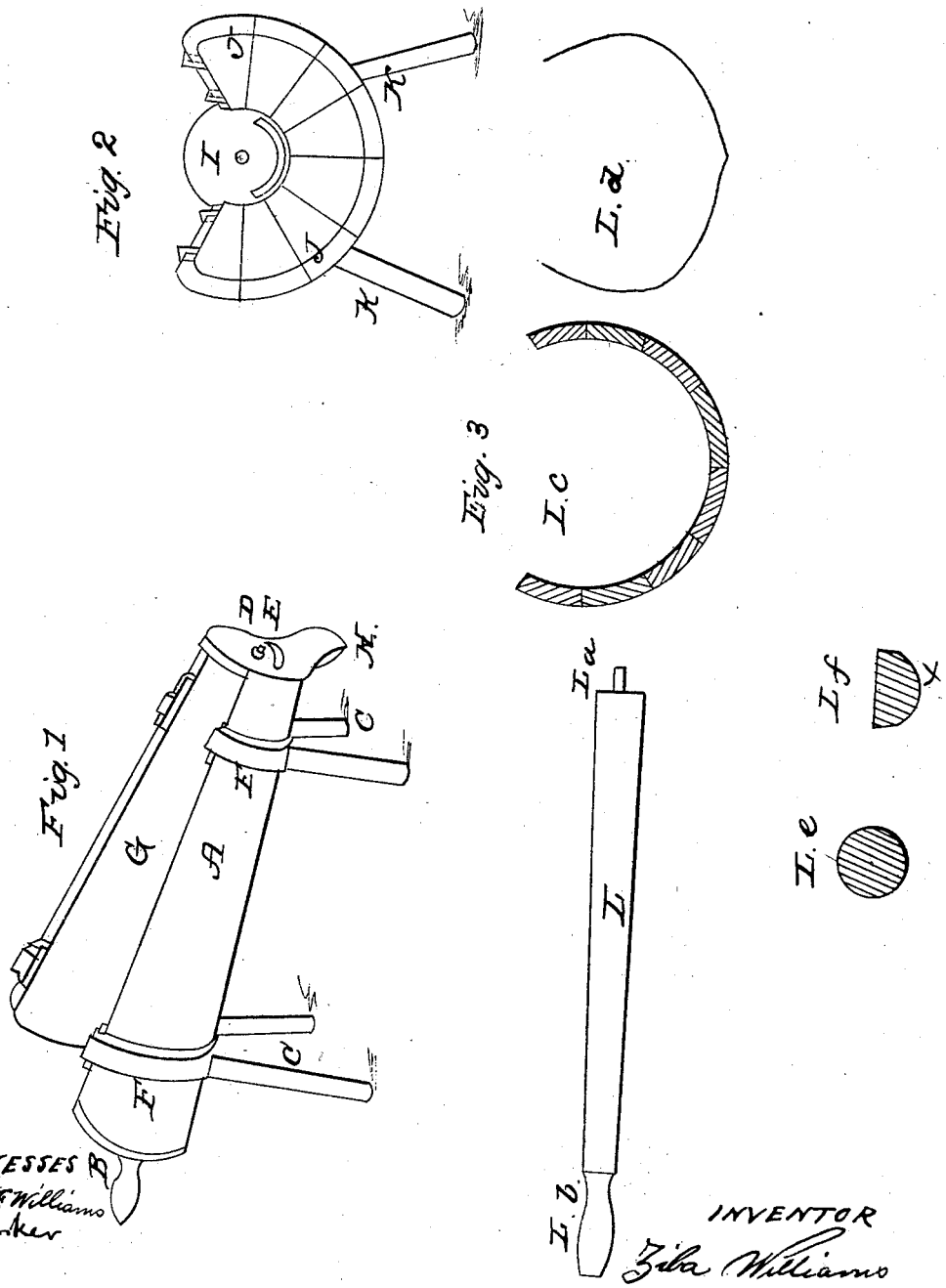

UNITED STATES PATENT OFFICE.

ZIBA WILLIAMS, OF ITHACA, NEW YORK.

BUTTER-WORKER.

Specification of Letters Patent No. 21,460, dated September 7, 1858.

*To all whom it may concern:*

Be it known that I, ZIBA WILLIAMS, of the town of Ithaca, county of Tompkins, and State of New York, have invented an Improved Machine for Working Butter and other Similar Substances; and I do hereby declare that the following is a full and exact description of the same, reference being had to the accompanying drawings, of which—

Figure 1, is a perspective side view; and Fig. 2, is a view looking down into the butter worker; and Fig. 3, are views of parts thereof.

In Fig. 1 A is the trough in which the butter is worked. B is the handle of the ladle, which works the butter in the trough. C, C, are the legs that support the machine, those at the smaller end of the trough being shorter than those at the larger end for the purpose of inclining the trough. D is the hole, in which the journal in the end of the ladle, loosely plays, as it works the butter. E, is a slot-opening, to allow the escape of the butter milk, and the water used to wash the butter. G is the open portion of the trough, for the purpose of allowing the butter to be put in, and freely seen and to apply salt, water, or other means of completing the working of the butter. H is a vessel that receives the butter-milk and washings, from the spout below the slotted opening E. F, F are the two rigid ribs or hoops that hold the trough together, and also receive the legs, which support the trough.

In Fig. 2, the larger end of the trough is represented as nearest the eye, and the shape of the trough is seen by the edge J, J. In the drawing the butter worker is shown to be made of staves, held together by the above-named stiff hoops. K, K, are the legs of the larger end. I is the smaller end of the trough with a hole for the journal of the ladle, and the slotted opening for the escape of fluids, in it.

In Fig. 3, L is the ladle, the larger end fitting the smaller end of the trough. $L^a$ is the journal above named. $L^b$ is the above named handle. $L^c$ is a section of the trough, represented as part of a circle. $L^d$ is another form of the inside curve of the trough, and is in many respects better than the circular one. It is similar to the section of a good porcelain mortar; and therefore the better causes the butter to roll on itself, while being worked. $L^e$, is a section of the ladle in a circular form; and $L^f$ is another form of the ladle, the side, $x$, being in contact with the butter. The larger end of the trough is either open or closed slightly by a rim. The exact form of the trough is a truncated cone, with a portion cut off by a plane passing parallel to the longitudinal axis thereof, leaving half or two thirds of the cone to form the trough. When the bottom of the trough is mortar shaped it is of a similar truncated cone section with the bottom, or side opposite the portion cut off by the plane, shaped like the section of a mortar.

The use of this apparatus for working butter is sufficiently apparent to those skilled in the art of making butter. The ladle is so arranged as to exert great power in crushing the butter in cold weather, as well as the gentlest force. The trough being open, there is the present access to the butter. The motion of the ladle reciprocating from side to side, to just what is necessary to extract the butter-milk, and yet not crush too much the butter. In a word, my own experience, and that of others has amply demonstrated the utility and efficiency of the machine.

I am aware now, though not at the time of my invention, of the claim patented to Josiah M. Williams, Feb. 6th 1855. It is no part of my desire to claim a conical "bowl with a conical roller, working on its apex."

What I claim as my invention and desire to secure by Letters Patent, is,—

The combination of a trough, and a ladle having parallelism to the axis thereof, for the purpose of working butter, when the same are constructed and arranged in the manner herein described.

Ithaca, Tompkins Co., New York, July 3rd, 1858.

ZIBA WILLIAMS.

Witnesses:
S. J. PARKER,
C. F. WILLARD.